US012009756B2

(12) United States Patent
Medagam et al.

(10) Patent No.: US 12,009,756 B2
(45) Date of Patent: Jun. 11, 2024

(54) VOLTAGE DOUBLING VARIABLE FREQUENCY DRIVE

(71) Applicants: Peda V Medagam, Rapid City, SD (US); Jack Yang, Rapid City, SD (US); Nicholas R Kingsbury, Rapid City, SD (US)

(72) Inventors: Peda V Medagam, Rapid City, SD (US); Jack Yang, Rapid City, SD (US); Nicholas R Kingsbury, Rapid City, SD (US)

( * ) Notice: Subject to any disclaimer, the term of this patent is extended or adjusted under 35 U.S.C. 154(b) by 30 days.

(21) Appl. No.: 16/571,092

(22) Filed: Sep. 14, 2019

(65) Prior Publication Data

US 2021/0083592 A1 Mar. 18, 2021

(51) Int. Cl.
*H02M 5/458* (2006.01)
*H02P 27/08* (2006.01)

(52) U.S. Cl.
CPC .......... *H02M 5/4585* (2013.01); *H02P 27/08* (2013.01)

(58) Field of Classification Search
CPC ............ H02M 5/40; H02M 5/42; H02M 5/45; H02M 5/4505; H02M 5/458; H02M 5/4585; H02M 7/06; H02M 7/062; H02M 7/10; H02M 7/125; H02M 7/155; H02M 7/1555; H02H 7/1216; H02H 7/125; H02P 27/08
See application file for complete search history.

(56) References Cited

U.S. PATENT DOCUMENTS

| 8,941,340 B2* | 1/2015 | Meiners | H02M 5/4585 318/400.29 |
|---|---|---|---|
| 9,871,462 B2* | 1/2018 | Medagam | H02M 5/458 |
| 2010/0110738 A1* | 5/2010 | Shimizu | H02M 1/4225 363/124 |
| 2013/0106328 A1* | 5/2013 | Kopiness | H02M 1/36 318/400.11 |
| 2013/0176753 A1* | 7/2013 | Swamy | H02M 1/4216 363/37 |
| 2015/0048807 A1* | 2/2015 | Fan | H02M 1/4225 323/208 |

OTHER PUBLICATIONS

J.R. Rodriguez; J.W. Dixon; J.R. Espinoza; J. Pontt; P. Lezana; "PWM regenerative rectifiers: state of the art"; Feb. 7, 2005; IEEE; IEEE Transactions on Industrial Electronics; pp. 5-22 (Year: 2005) (Year: 2005).*
J.R. Rodriguez; J.W. Dixon; J.R. Espinoza; J. Pontt; P. Lezana; "PWM regenerative rectifiers: state of the art"; Feb. 7, 2005; IEEE; IEEE Transactions on Industrial Electronics; pp. 5-22 (Year: 2005).*

* cited by examiner

*Primary Examiner* — Thienvu V Tran
*Assistant Examiner* — Shahzeb K Ahmad

(57) ABSTRACT

Briefly, a voltage doubling variable frequency drive includes an active converter connected to a DC bus that is connected to a first inverter that converts DC power to variable frequency, three-phase AC power, and variable frequency, three-phase AC power to DC power, and to a second inverter that converts DC power to three-phase AC sine wave power. The converter converts single-phase AC power to DC power and DC power to single-phase AC power and maintains a selected voltage on the DC bus. The converter has an active rectifier and a controller that drives the rectifier with a pulse width modulation according to a switching scheme that switches the rectifier according to an adaptive hysteresis control to maintain constant switching.

19 Claims, 4 Drawing Sheets

US 12,009,756 B2

VOLTAGE DOUBLING VARIABLE FREQUENCY DRIVE

TECHNICAL FIELD

The present invention relates to a three-phase variable frequency drive with a voltage doubling converter on the front side that converts three-phase AC input to DC with regenerative capability. The DC can then be converted to a three phase output.

BACKGROUND ART

Three-phase variable frequency drives are commonly used in speed control for alternating current (AC) motors. Variable frequency drives generally include a diode rectifier, that converts AC power to direct current (DC) power, connected through a DC bus to an inverter that supplies a three phase output, variable frequency AC power to a three-phase motor.

A variable frequency drive using such a diode bridge draw non-sinusoidal, non-linear input currents from the AC power line and cause several detrimental effects. IEEE 519 standard recommends limits of 5-8% total harmonic distortion (THD) to protect assets on the power grid. Due to the substantial irregularities that the diode bridge causes to the power grid, substantial passive filters must be placed between the variable frequency drive and the power grid. The passive filters that meet IEEE-519 standards are expensive and not readily available. They also have disadvantages such as resonance with the utility, large size, and weight, and may not be suitable for variable loads. In addition to these limitations, passive filters must be designed for particular frequencies and thus may not affect all of the harmonic currents.

Regeneration occurs in variable frequency drives when the load overhauls the motor. Simply stated, an overhaul condition is when the load is driving the motor, instead of the motor driving the load. In this way, in an overhaul condition the motor has excess power that must be managed and controlled. This regenerative power is traditionally wasted as heat using dynamic braking resistors. However, Dynamic braking resistors add complexity and expense to a variable frequency drive installation. Further, as the motor is generating additional heat, more cooling is needed, and excess heat is known to damage electrical and mechanical parts.

A common implementation uses a 240 volt input to the variable frequency drive (VFD), although other voltages may be used. For the three-phase 240 volts, 60 Hz power is usually provided by a step-down transformer connected to a high voltage line in many residential and rural areas. Many three-phase induction motors are operated at a higher voltage such as 460 volts to reduce the current passing between the inverter of the variable frequency drive and the motor, and thereby reducing the required size of the connecting cables. Diode rectifier converters cannot directly boost the incoming 240 volts to 460 volts. The unbalanced three-phase AC voltage is also very common in rural areas, with such unbalanced voltages diode bridge variable frequency drives drawing unbalanced currents from the AC source and causing higher stress on VFD components.

One method to reduce input harmonics, provide regenerative capability and voltage doubling for variable frequency drives is by using an active switching full bridge rectifier. Such rectifier includes power transistors and diodes to control the waveform of the input currents actively. An active switching full bridge rectifier improves the input power factor by controlling and reshaping the input current waveforms, as a result, eliminating harmonic distortion. Being regenerative means allowing power to flow in both directions, in and out of a drive.

Different control methods have been proposed in the literature to control three-phase active front end converters. Most of these control techniques depend on the derivation of the reference current to the three-phase active front end converter, requiring the real-time calculations and bandwidth of the control. Hysteresis current control method has been proposed for different applications in the literature, and has the advantages of higher bandwidth, fast dynamic performance, excellent stability and independence of system parameters. An issue with traditional hysteresis current control method is that it uses a fixed hysteresis band. A fixed band hysteresis control causes the switching frequency to vary widely depending on the load and instantaneous magnitude of the current, causing unpredictable EMI radiations and challenges.

DISCLOSURE OF THE INVENTION

The present disclosure defines an adaptive hysteresis current control method for an active front end variable frequency drive (VFD). For the present invention, adaptive hysteresis control techniques have been proposed to maintain a constant average switching frequency.

It is an object of the invention that the control method boosts the output voltage.

It is an object of the invention that the control method controls the input currents to reduce input line harmonics.

It is an object of the invention that the control method maintain input currents in phase with the utility to achieve near unity power factor It is still another object of the invention that the active front end variable frequency drive operates in o regenerative mode.

In accordance with the invention, the above objects are achieved by the disclosed control method comprises:

An active front end variable frequency drive for converting three-phase AC power to a variable frequency three-phase AC power includes a three-phase AC power source, a three-phase AC to DC power converter, a DC bus, an inverter that converts DC power to a variable frequency, and input controller.

The input controller includes the following functional blocks within its enclosure: Voltage and current detection module, DC measurement, sector calculator, hybrid band generator, PLL, peak detection, DC bus voltage control, sine function, adaptive hysteresis control, and PWM unit.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
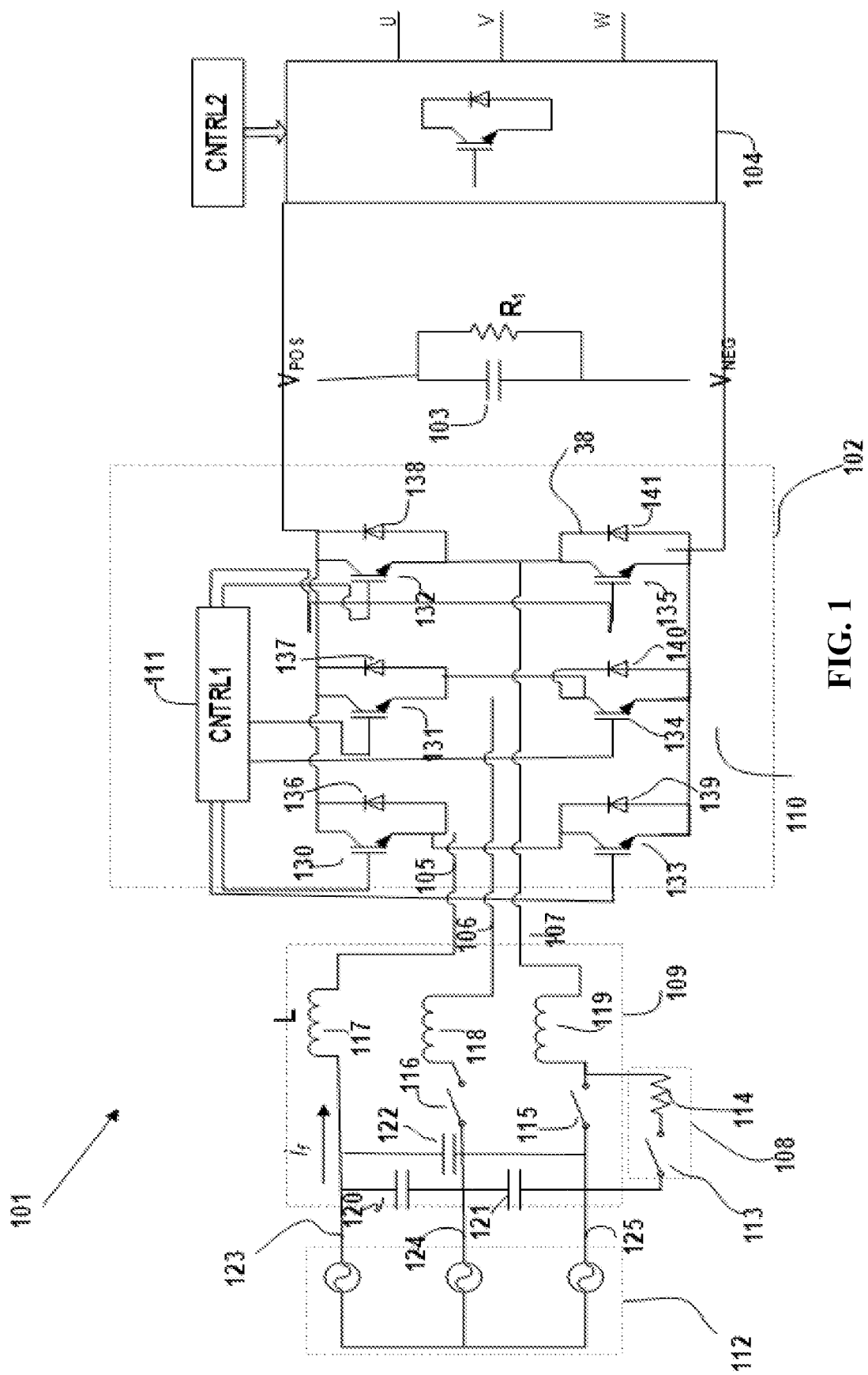
FIG. 1 is a schematic diagram of a variable frequency drive embodying the features of the present invention.

Referring to FIG. 1, a regenerative variable frequency drive 101, embodying the features of the present invention, includes an active converter 102, a DC bus 103 connects to the converter 102, and inverter 104 connected to the DC bus 103. The converter 102 includes first, second, and input lines 105, 106 and 107, a precharging circuit 108, an input filter 109, an active rectifier 102 and a controller 111. The first, second and third input lines 105, 106 and 107 connect to a three-phase AC source 112. Generally, source 112 will be a utility power grid. In the United States, the source 112 will typically provide power at 240V at 60 Hz.

The precharging circuit 108 connects along the second and third input line 106, 107 and includes a relay switch 113 connected in series to a resistor 114, and a contactor switches 115 and 116 connected in parallel to the relay switch 113 and the resistor 114. During startup of the drive 101, the relay switch 113 is closed, and the contactor switches 115 and 116 are open so that current passes through resistor 114 to avoid excessively high input current when power is applied to the converter 102. After the DC bus 103 is charged, the contactor switches 115 and 116 are closed to bypass resistor 114.

The input filter 109 has filter inductors 117, 118, 119 and filter capacitors 120, 121, and 122. The filter inductor 117 is connected along the first input line 105, a second inductor 118 that connects along the second input line 106 and third inductor 119 that connects along the third input line 107. The first filter capacitor 120 connects between the first input line 123 and second input line 124. The second filter capacitor 121 connects between the second input line 124 and the third input line 125. Similarly, the third filter capacitor 122 connects between the third input line 125 and the first input line 123.

The rectifier 110 is an active switching full bridge rectifier with first, second, third, fourth, fifth and sixth switches 130, 131, 132,133,134 and 135, and first, second, third, fourth, fifth, and sixth diodes 136, 137, 138, 139,140 and 141. The first, second, third, fourth, fifth, and sixth switches 130, 131, 132,133,134 and 135 each have a collector, a base and an emitter. The first, second, third, fourth, fifth, and sixth switches 130, 131, 132,133,134 and 135 are preferably solid state switches and more preferably Insulated Gate Bipolar Transistors (IGBT). The first, second, third and fourth diodes 136, 137, 138, 139,140 and 141 each have an anode and a cathode.

The variable frequency drive operates in a regenerative mode. The input side 6 IGBTs, 130, 131, 132, 133, 134 and 135 can be controlled by the CNTRL1 (111) to move energy both ways, loading or regenerative, regenerative means energy from the output side inverter 104 can be moved to the source 112.

Figure 2:
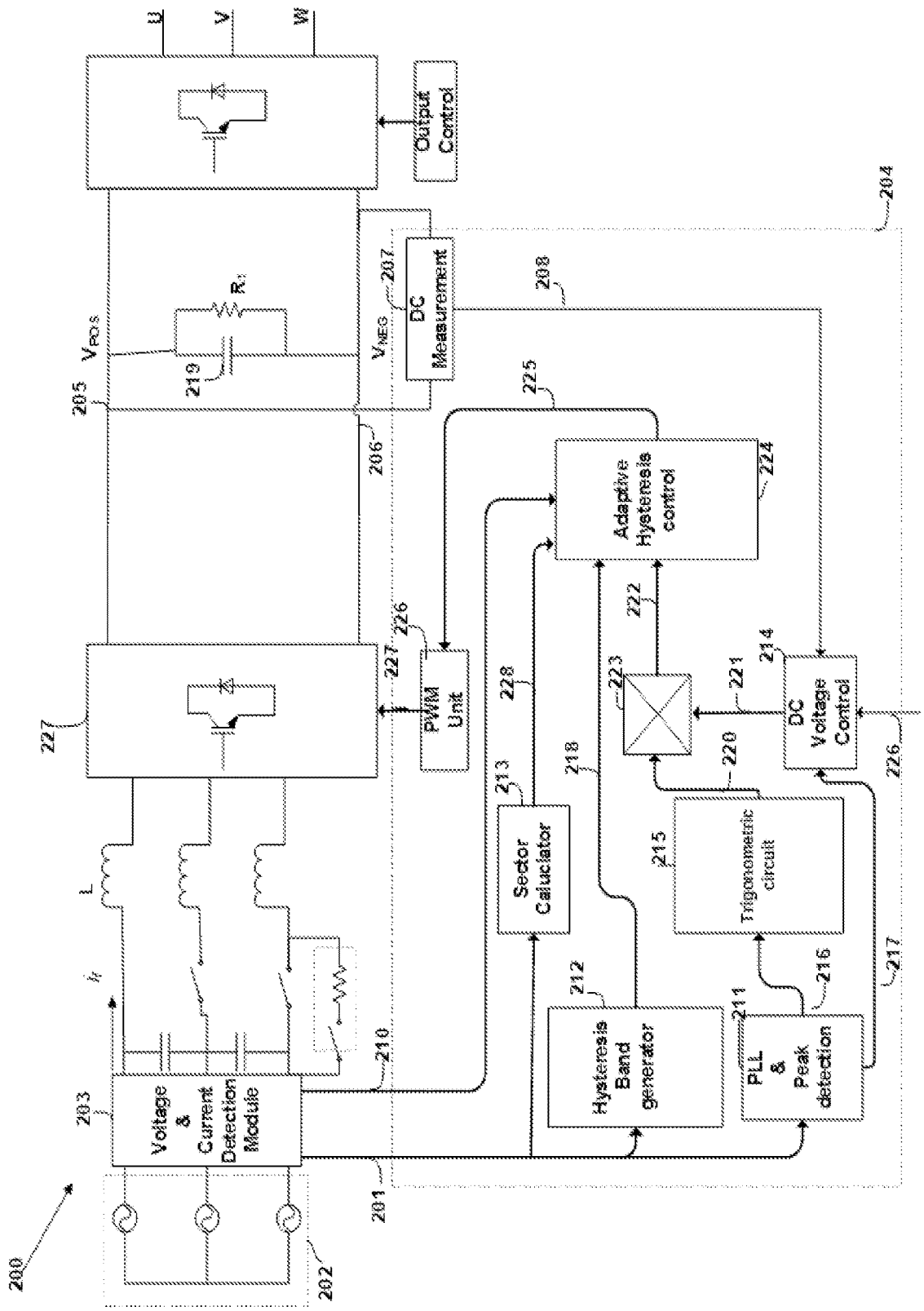
FIG. 2 is a block diagram of an active front end converter controller circuit of the variable frequency drive of FIG. 1.

FIG. 2 is a functional block diagram 200 illustrating, according to the present invention, a device 201 for controlling the input to an AC-DC converter. In the preferred embodiment shown in FIG. 2, the phase voltages and currents of source 202 are measured with voltage and the current detection module 203. Although other types of sensors can be utilized with the present invention, such as voltage sensing resistors, Hall-effect current sensors, and current sensing transformers. Once the phase voltages and currents are measured, digital electrical signals representing data concerning the phase voltages and currents are communicated from the current detection module 203 to a microcontroller unit 204 through communication lines 201 and 210.

The instantaneous DC bus voltage between positive 205 and negative 206 bus lines is measured with voltage sensor 207 for feedback control purposes. Once the DC bus voltage of the drive 200 is sensed, digital electrical signals representing data concerning the DC voltage are communicated from the sensor 207 to the microcontroller unit 204 through the communication line 208. The DC bus voltage between 205 and 206 is controlled (maintained) to a targeted level, so that input side will adjust either to boost or regenerate to it. The measurement by 207 is feedback to 214 for controlling the DC bus.

The data concerning the phase voltages is communicated through line 201 to a PLL & Peak detection circuit 211, hysteresis band generator 212, and sector calculator circuit 213 in the microcontroller unit 204 for implementation of an "adaptive hysteresis control". In particular, data concerning input 202 phase voltages $V_{12}$, $V_{23}$, and $V_{31}$ are communicated via a line 210 to the PLL & Peak detection circuit 211, hysteresis band generator 212, and sector calculator circuit 213. The data concerning phase currents $i_a$, $i_b$ and $i_c$, are communicated via a line 210 to the adaptive hysteresis control circuit 212. Data concerning the dc bus voltage is communicated via a line 208 to the dc voltage control circuit 214. The PLL & peak detection circuit 211 is a conventional phase lock loop circuit that generates an output angle signal whose phase is related to the input voltage signal. The peak detection circuit generates a peak signal of the input voltage. Once the PLL signals θ, and input voltage peak and Vpeak are determined by the circuit 211, the peak signal and angle signal θ are communicated to a trigonometric circuit 215 via a line 216, and Vpeak signal is communicated to DC bus voltage control circuit 214 via 217. The trigonometric circuit generates sin(θ), sin(θ+120°), and sin(θ−120°) and transfer to multiplication block via 220.

The DC bus controller 214 controls the converter 227 dc bus voltage to maintain a selected voltage on the DC bus capacitor 219. This selected voltage may be somewhat higher than double the input peak. For example, if the input is 240 VAC, peak is 340 VDC, bus is maintained as a fixed value usually between 700 VDC and 760 VDC. Proportional integral (PI) control is used to regulate the DC bus voltage $V_{dc}$ to the reference value $V^*_{dc}$. The DC reference voltage must be higher than or equal to the magnitude of the source peak voltage for satisfactory operation of the converter 227. The current command amplitude $I_m$ for the converter 227 can be presented by $$I_m = (K_P(V^*_{dc} - V_{dc}) + K_I \int (V^*_{dc} - V_{dc}) dt)$$

where $K_p$ is the proportional gain constant and $K_I$ is the integral gain constant of the PI control.

Figure 3:
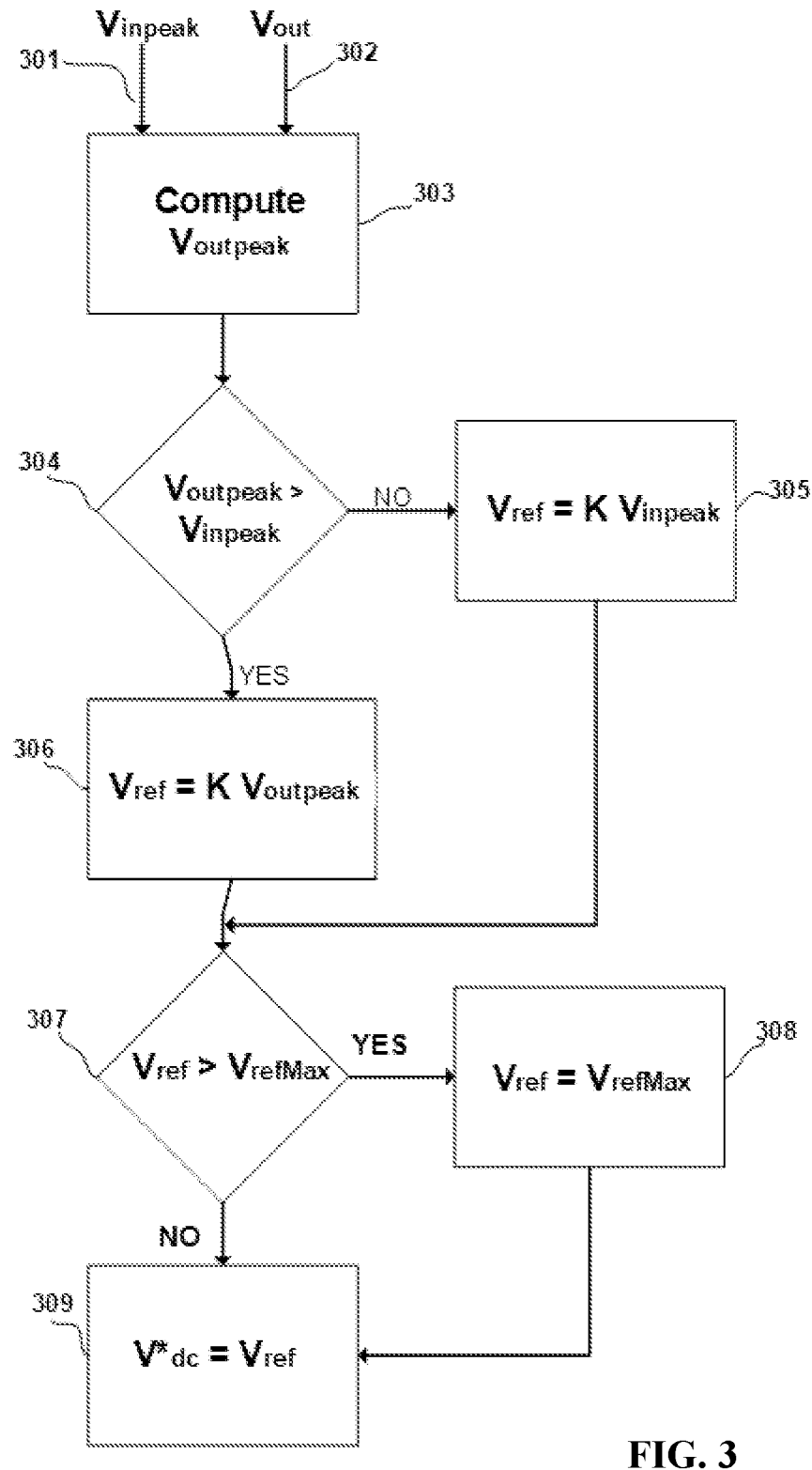
FIG. 3 is a flow diagram illustrating, according to the present invention, a method to generate dc bus voltage reference in FIG. 1.

The reference DC bus voltage $V^*_{dc}$ generated using the flow diagram explained in FIG. 3. Input peak voltage generated using PLL & peak detection circuit 211, and the required the output voltage output voltage $V_{out}$ are given to $V_{outpeak}$ compute circuit 303. Once the output voltage peak determined in the step 303, the comparison made in the step 304 is used to determine whether the $V_{outpeak}$ is greater than $V_{inpeak}$ or not. If the $V_{outpeak}$ is greater than $V_{inpeak}$, step 306 set $K^*V_{outpeak}$ as the $V_{ref}$, otherwise, $V_{ref}$ is set as $K^*V_{inpeak}$ where K is a constant. Step 307 compares between the $V_{ref}$ decided from step 306 and compares it with the maximum bus capacitor voltage $V_{refMax}$ for a system to see if such $V_{ref}$ greater than $V_{refMax}$, if the answer is yes, then $V_{refMax}$ is assigned to $V^*_{dc}$, otherwise, $V_{ref}$ from the result of step 305 or 306 is assigned to $V^*_{dc}$.

Further in FIG. 2, The current command amplitude $I_m$ generated by DC voltage control 214 unit is given to multiplication block 223 via communication line 221 and also trigonometric functions given to multiplication block 223 via 220. The multiplication block 223 multiplies current command amplitude $I_m$ by the trigonometric functions to get reference currents for each phase as follows $$I^*_a = I_m \sin(\theta)$$

$$I^*_b = I_m \sin(\theta + 120°)$$

$$I^*_c = I_m \sin(\theta - 120°)$$

The output of multiplication block is given to adaptive hysteresis control circuit 224 through command lines 222.

Figure 4:
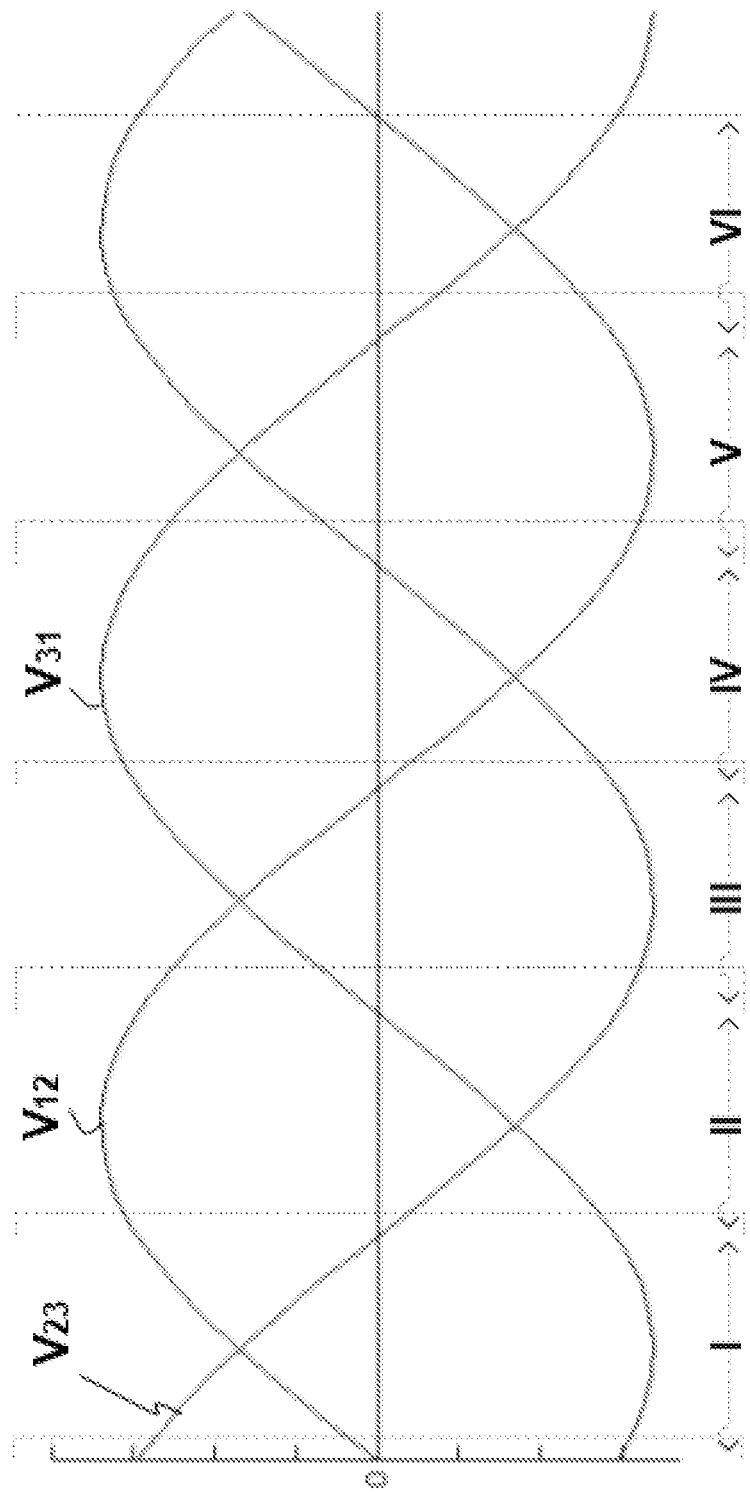
FIG. 4 shows the definition of sectors and illustrates the relationship between any sector and the three voltages. There are 6 equally separated sectors based on the relationship between the three voltages. For example, sector I has $V_{12}$ positive, $V_{23}$ positive and $V_{31}$ negative, sector 2 has $V_{12}$ positive, $V_{23}$ negative and $V_{31}$ negative . . . .

As shown in FIG. 4, three-phase source voltages are divided into six equal areas called sectors. Sector calculator 213 determines the sector by comparing V12 V13 V23 voltages. The output of sector calculator 213 is connected to adaptive hysteresis control via 228.

The hysteresis bandwidth can determine switching frequency, which is fundamental of the novel adaptive current hysteresis band control algorithm. Switching frequency is generated by the hysteresis control circuit 212. For example, if the hysteresis bandwidth is narrower, then the controller will turn on and off IGBTs at higher frequencies, and if the bandwidth is wider, then the controller will turn on and off the IGBTs at slower frequencies. In this way, a proper bandwidth can adapt and optimize switching frequency affecting waveforms, heat and harmonics. PWM gate pulses for the IGBTs are generated using a hysteresis current controller which compares the error between the measured inductor current and the reference current against a fixed hysteresis band. In a conventional fixed hysteresis band control method, the switching frequency does not remain constant but depends on the rate of change of current. Hence an adaptive hysteresis band control is developed to maintain a constant average switching frequency. Online hysteresis band is calculated using the measured instantaneous values of DC bus voltage and input voltage. The hysteresis band for the Three-phase active front end system is calculated as the follows:

$$HBx = \frac{V_{dc}}{8Lf}\left[1 - \frac{4L^2}{V_{dc}^2}\left[\frac{Vx}{L} - m\right]^2\right]$$

Where x is a, b and c. Example: HBa is for $I_a$, Va is $V_{12}$, Vb is $V_{23}$, Vc is $V_{31}$. m is a constant. L is the loop inductance, f is the switching frequency. $V_{dc}$ is the DC bus voltage.

The adaptive hysteresis control block 224 requires measured currents from block 203, sectors from block 213, hysteresis band from block 212, reference currents from block 222 as inputs to generate output signals. The switching table for six sectors for adaptive hysteresis control is shown in the following table.

| Sector | Z1 (130) | Z2 (131) | Z3 (132) |
|---|---|---|---|
| I | ON If $I_a > I_a^* + HB_a$ Else OFF | ON If $I_b > I_b^* + HB_b$ Else OFF | OFF |
| II | ON | ON If $I_b < I_b^* + HB_b$ Else OFF | ON If $I_c < I_c^* + HB_c$ Else OFF |
| III | ON If $I_a > I_a^* + HB_a$ Else OFF | OFF | ON If $I_c > I_c^* + HB_c$ Else OFF |
| IV | ON If $I_a < I_a^* + HB_a$ Else OFF | ON If $I_b < I_b^* + HB_b$ Else OFF | ON |
| V | OFF | ON If $I_b > I_b^* + HB_b$ Else OFF | ON If $I_c > I_c^* + HB_c$ Else OFF |
| VI | ON If $I_a < I_a^* + HB_a$ Else OFF | ON | ON If $I_c < I_c^* + HB_c$ Else OFF |

Z1 (130) and Z4 (134), Z2 (131) and Z5 (134), Z3 (132) and Z6 (135) are switching pairs, when one is on the other one is off.

For sector I, V12, V23 are positive, V31 is negative. Z4 and Z5 are active switchers, Z1 is on when Z4 is off, Z3 is ON when Z5 is OFF. Set Z3 OFF. If Z4 switching current exceeds $I_a^* + HB_a$ Z4 should be OFF and Z1 is ON. Similarly, Z2 is ON if Z5 current exceeds $I^*_b + HB_b$.

For sector II, V12 is positive, V23 and V31 are negative. Z2 and Z3 are active switchers. Set Z1 ON. If Z2 switching current exceeds $I^*_b + HB_b$, Z2 should be OFF. Similarly, Z3 is OFF if Z3 current exceeds $I^*_c + HB_c$.

For sector III, V31 and V12 are positive, V23 is negative. Z4 and Z6 are active switchers. Set Z2 ON. If Z4 switching current exceeds $I_a^* + HB_a$ Z1 should be ON. Similarly, Z3 is ON if Z6 current exceeds $I^*_c + HB_c$.

For sector IV, V31 is positive, V23 and V12 are negative. Z5 and Z6 are active switchers. Set Z1 OFF, Z4 ON. If Z5 switching current exceeds $I^*_b + HB_b$ Z2 should be ON. Similarly, Z3 is OFF if Z6 current exceeds $I^*_c + HB_c$.

For sector V, V31 and V23 are positive, V12 is negative. Z5 and Z6 are active switchers. Set Z1 OFF. If Z5 switching current exceeds $I_b^* + HB_b$ Z2 should be ON. Similarly, Z3 is ON if Z6 current exceeds $I^*_c + HB_c$.

For sector VI, V23 is positive, V31 and V12 are negative. Z1 and Z3 are active switchers. Set Z2 ON. If Z1 switching current exceeds $I_a^* + HB_a$ Z1 should be OFF. Similarly, Z3 is OFF if Z3 current exceeds $I^*_c + HB_c$.

Although the present invention has been described with a certain degree of particularity, it is understood that the present disclosure has been made by way of example and that changes in details of structure may be made without departing from the spirit thereof.

What is claimed is:

1. A voltage doubling converter for a three phase variable drive, comprising:
   a three phase power input having a three phase power input voltage;
   an active full bridge rectifier circuit having a set of switching transistors operably coupled to the three phase power input having a DC power output;
   an adaptive hysteresis current control unit coupled to the active full bridge rectifier circuit;

an inverter coupled to the DC power output;
a three phase power output having a three phase power output voltage;
wherein the three phase power output voltage is greater than the three phase power input voltage; and
wherein the adaptive hysteresis current control unit is constructed to:
  measure the three phase power input to determine respective phase voltages for $V_{12}$ corresponding to a first phase, $V_{23}$ corresponding to a second phase and $V_{13}$ corresponding to a third phase;
  define three phase sectors wherein for each sector, two of $V_{12}$, $V_{23}$ and $V_{13}$ are the same polarity, and the other is the opposite polarity;
  set the state of the set of switches according to which three phase sector the three-phase power input is in; and
  wherein the three phase sectors are used to set the state of the switching transistors in order to maintain a constant average switching frequency.

2. The voltage doubling converter according to claim 1, wherein the three phase power output voltage is about double the three phase power input voltage.

3. The voltage doubling converter according to claim 1, wherein a processor controls the set of switching transistors to regenerate power by moving current from the DC power output to the three phase power output.

4. The voltage doubling converter according to claim 1, wherein the set of switching transistors comprise solid state switches.

5. The voltage doubling converter according to claim 4, wherein the set comprises 6 solid state switches.

6. The voltage doubling converter according to claim 4, wherein the set comprises 6 insulated gate bipolar switches.

7. The voltage doubling converter according to claim 1, wherein the three phase power output is constructed to meet total harmonic distortion limit of 5-8%.

8. The voltage doubling converter according to claim 1 further including a processor that controls the set of transistors to maintain the constant average switching frequency.

9. The voltage doubling converter according to claim 8 wherein the processor implements an adaptive hysteresis control technique.

10. The voltage doubling converter according to claim 9 wherein the hysteresis control technique uses a measured hysteresis bandwidth to determine switching frequency for the set of switching transistors.

11. The method according to claim 1, wherein 6 sectors are defined.

12. A method for controlling a variable frequency drive, comprising:
  receiving a three phase power input having a three phase power input voltage;
  measuring the three phase power input to determine respective phase voltages for $V_{12}$ corresponding to a first phase, $V_{23}$ corresponding to a second phase and $V_{13}$ corresponding to a third phase;
  defining three phase sectors wherein for each sector, two of $V_{12}$, $V_{23}$ and $V_{13}$ are the same polarity, and the other is the opposite polarity;
  applying the three phase power input voltage to an active full bridge rectifier, the full bridge rectifier having a set of switching transistors;
  controlling the state of the set of switching transistors using a controller circuit by setting the state of the switches according to which three phase sector the three phase power input is in;
  generating a DC voltage from the active full bridge rectifier;
  generating a variable frequency three phase power output voltage from the DC voltage; and
  wherein the three phase power output voltage is greater than the three phase power output voltage and the three phase sectors are used to set the state of the switching transistors in order to maintain a constant average switching frequency.

13. The method according to claim 12, wherein the three phase power output voltage is about double of the three phase power input voltage.

14. The method according to claim 12, wherein the controller circuit includes a processor that controls the set of switching transistors to maintain the constant average switching frequency.

15. The method according to claim 12, wherein the controller circuit implements an adaptive hysteresis control in controlling the state of the switching transistors.

16. The method according to claim 15, wherein the adaptive hysteresis control uses a measured hysteresis bandwidth to determine switching frequency for the set of switching transistors.

17. The method according to claim 12, further including the step of controlling the set of switching transistors to regenerate power by moving current from the DC power output to the three phase power output.

18. The method according to claim 12, wherein the set of switching transistors comprises 3 pairs of solid state switching transistors.

19. The method according to claim 12, wherein a 240V AC three phase input power voltage can generate a of 480V AC three phase output power voltage.

* * * * *